United States Patent [19]

Brandiser et al.

[11] Patent Number: 5,662,571
[45] Date of Patent: Sep. 2, 1997

[54] DEFLECTION CONTROLLED ROLL

[75] Inventors: Herbert Brandiser, Mochenwangen; Christoph Link, Weingarten, both of Germany

[73] Assignee: Voith Sulzer Papiermaschinen GmbH, Heidenheim, Germany

[21] Appl. No.: 520,248

[22] Filed: Aug. 28, 1995

[30] Foreign Application Priority Data

Aug. 29, 1994 [DE] Germany .............. 44 30 667.9

[51] Int. Cl.$^6$ .................................. B29C 43/46
[52] U.S. Cl. ................................ 492/7; 492/16
[58] Field of Search ................ 492/7, 5, 2, 16, 492/20

[56] References Cited

U.S. PATENT DOCUMENTS

| 4,074,624 | 2/1978 | Biörnstad et al. ............... 492/7 |
| 4,090,282 | 5/1978 | Lehmann . |
| 4,644,860 | 2/1987 | Brendel ......................... 492/7 |
| 4,727,691 | 3/1988 | Kubacak . |
| 4,729,153 | 3/1988 | Pav et al. ....................... 492/7 |
| 4,796,525 | 1/1989 | Schiel et al. ................. 492/20 |

FOREIGN PATENT DOCUMENTS

| 0451470 | 10/1991 | European Pat. Off. . |
| 2368631 | 10/1977 | France . |
| 2759035 | 6/1979 | Germany . |
| 3020669 | 12/1981 | Germany . |
| 673051 | 1/1990 | Switzerland . |
| 2158196 | 11/1985 | United Kingdom ............... 492/7 |

OTHER PUBLICATIONS

German Office Action dated Jul. 4, 1995.
H. Kunkel et al. "Hydrostatische Lager", in DE-Z fluid [German Publication 'fluid'], Apr. 1973, pp. 114, 116–118, 120.
Bresser et al., "SNC —Der Superkalandar Der 90er Jahre", Das Papier, vol. 43, No. 10A, pp. 169–182 (Oct. 1989).
European Search Report.

*Primary Examiner*—David P. Bryant
*Attorney, Agent, or Firm*—Greenblum & Bernstein, P.L.C.

[57] ABSTRACT

Deflection controlled roll. A deflection controlled roll is comprised of a fixed carrier and a roll jacket rotatable about the carrier, with the roll jacket being supported on the carrier via several support elements, wherein each of the support elements has at least one cylinder-piston device, for the formation of a contact force, and a bearing shoe with a separate lubricating fluid supply and wherein the fluid supply of pressure chambers of the cylinder-piston devices is accomplished at least in separate groups, via pressure conduits, with the deflection controlled roll, even though being supported via large number of support elements, being produced in a vibration damping-manner in a simple construction, wherein the pressure conduits have substantially the same length and/or the same volume capacity for the pressure fluid.

13 Claims, 1 Drawing Sheet

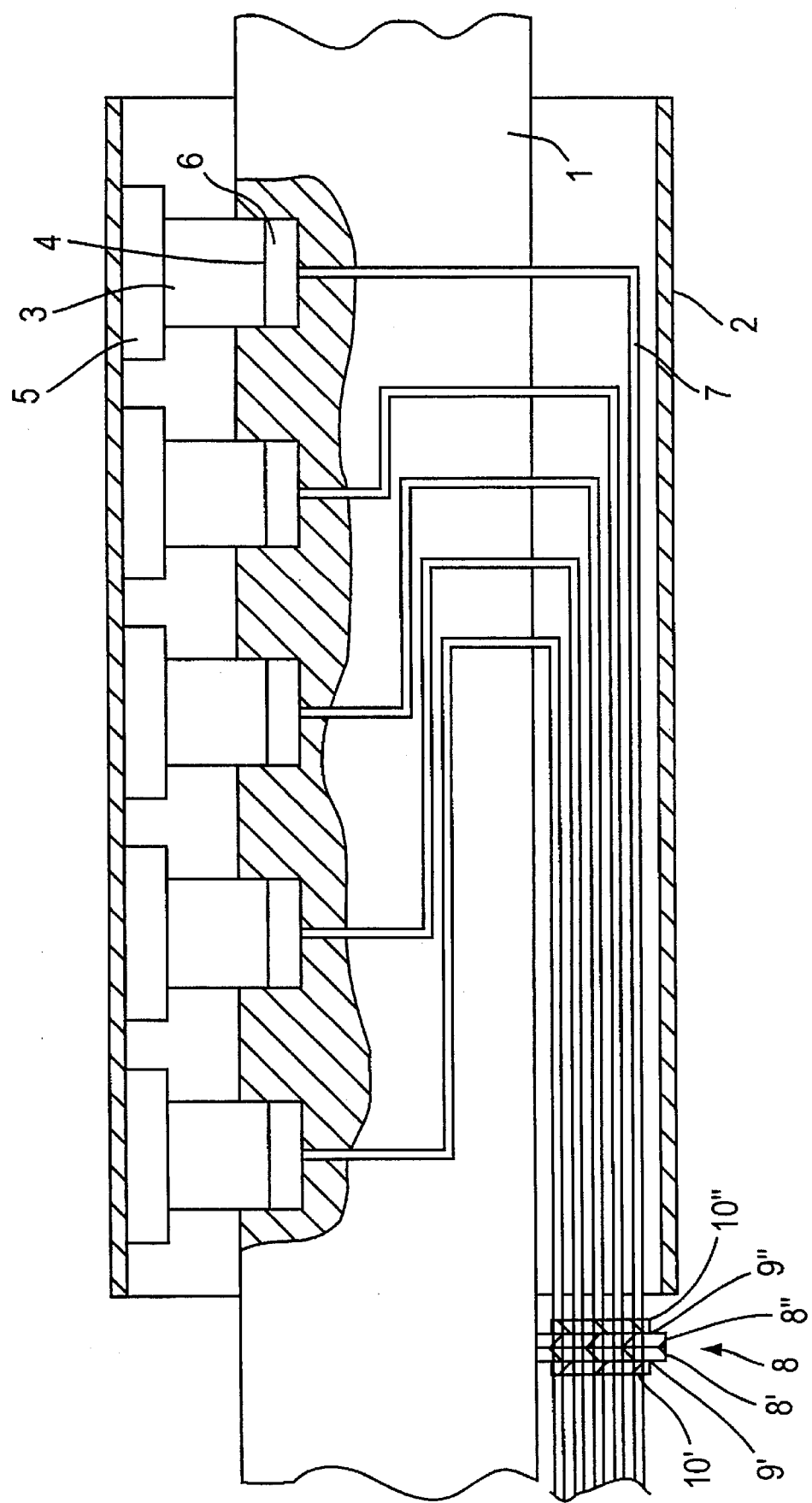

5,662,571

DEFLECTION CONTROLLED ROLL

CROSS REFERENCE TO RELATED APPLICATIONS

This application claims the priority of German Application No. DE P 44 30 667.9, filed Aug. 29, 1994, the disclosure of which is incorporated herein by reference in its entirety.

BACKGROUND OF THE INVENTION

1. Field of the Invention

This invention pertains to a deflection controlled roll comprised of a fixed carrier and a roll jacket rotatable about the carrier, with the roll jacket being supported on carrier via several support elements, wherein each of the support elements has at least one cylinder-piston device, for the formation of a contact force, and a bearing shoe with a separate lubricating fluid supply, wherein a separate fluid supply for the pressure chambers of the cylinder-piston devices is supplied, via pressure conduits, with such rolls being utilized during the production or treatment of web shaped material.

2. Discussion of the Background of the Invention and Material Information

Such rolls are known, for example, from German Patent Publication DE-AS 27 59 035 which describes grouped support elements, each of which is provided with a pressure conduit. Lubrication of the support areas of the bearing shoes is accomplished here via hydrostatic bearing pockets that are in contact with the pressure chamber of the cylinder-piston device of the support element.

Swiss Patent Publication CH-PS 673 051 sets forth a solution, wherein in distinction over the previous publication, the supply of the pressure fluid to the pressure chamber of the cylinder-piston devices is separated from the supply of the lubricating fluid to the bearing pockets of the bearing shoes. In addition to the thermal separation of the fluid circuits, this variation has the particular advantages that the lubrication is independent of the pressure circuit.

There however remains the disadvantage that the rolls, due to their complexity, relative to the possibly occurring vibrations, are very difficult to calculate and thus vibrations can only be damped in a limited manner. In addition, there is a different reaction behavior with respect to vibrations as well as in some circumstances if there is minor leakage of the pressure conduits or of the cylinder-piston devices along the roll axis. This aspect is increasingly important in rolls having a high number of support elements. A high or large number of pressure conduits also requires, due to the limitations of the roll or of the carrier, a smaller diameter of the individual pressure conduits. This in turn again influences the damping and the pressure storage behavior of the pressure conduits.

It is the task of this invention to produce a deflection controlled roll which, even though being supported via a large number of support elements, can be produced in a vibration damping manner and in a simple construction.

SUMMARY OF THE INVENTION

This task is achieved via the device set forth in the appended claims wherein a first embodiment of the deflection controlled roll of this invention comprises a fixed carrier and a roll jacket rotatable about the carrier, with the roll jacket being supported on the carrier via several support elements, wherein each of the support elements has at least one cylinder-piston device, for the formation of a contact force, a bearing shoe with a separate lubricating fluid supply wherein a separate fluid supply of the pressure chambers for the cylinder-piston devices is supplied, via pressure conduits, wherein the pressure conduits are at least one of approximately the same length and/or have approximately the same volume capacity for the pressure fluid.

In a further embodiment of the deflection controlled roll of this invention, at least sections of the pressure conduits are comprised of a flexible, vibration-damping material.

In another embodiment of the deflection controlled roll of this invention, portions of the pressure conduits are located within the roll, with these portions being of approximately the same length and/or having approximately the same volume capacity for the pressure fluid.

In a differing embodiment of the deflection controlled roll of this invention, the pressure conduits are connected with the roll via a multiple coupling.

In still a further embodiment of the deflection controlled roll of this invention, the pressure conduits, with reference to the construction and material composition thereof, are substantially identical.

Since the pressure conduits, arranged between the source of pressure and the support elements, are independent of the distance between the cylinder-piston device of each of the support elements and the corresponding pressure conduit connection associated with the roll ends, and have approximately the same length, this leads to a balancing of the vibration behavior of the pressure conduits. The same holds true when the volume capacities of the pressure conduits for the pressure fluid are about equal.

If both of these measures are implemented at the same time, the result is correspondingly improved. In addition, in this instance, the damping behavior of the pressure conduits is equalized, which increases in importance with small diameters of the pressure conduits.

It is also an advantage, if in the pressure conduits, at least sections or phases thereof are comprised of flexible, elastic and vibration damping material. In addition to easing the installation of the pressure conduits, this also leads to an improvement in terms of pressure accumulation in case of leakage. It is recommended that the portion of the pressure conduit, located within the roll, have about the same length, and/or about the same capacity volume for the pressure fluid.

For the connection of the pressure conduit from the pressure source onto the portion thereof contained within the roll, for ease of assembly, a multiple coupling should be utilized.

In general, in order to achieve matching behavior of the pressure conduits and also of the pressure roll, particularly along the roll axis, a substantially identical construction of the pressure conduits should be attempted. This holds true not only for the structure but also for the material composition thereof.

BRIEF DESCRIPTION OF THE DRAWINGS

The invention will be better understood and objects other than those set forth above will become apparent when consideration is given to the following detailed description thereof in connection with the annexed drawing wherein:

FIG. 1 is a substantially schematic axial sectional view of the deflection controlled roll of this invention.

DETAILED DESCRIPTION OF THE PREFERRED EMBODIMENTS AND BEST MODE

With respect to the drawing it is to be understood that only enough of the construction of the invention and the surrounding environment in which the invention is employed have been depicted therein, in order to simplify the illustration, as needed for those skilled in the art to readily understand the underlying principles and concepts of the invention.

The deflection controlled roll of this invention is essentially comprised of a carrier 1 and a roll covering or jacket 2 rotatable thereabout, with covering 2 being supported via several axially adjacent support elements 3 on carrier 1. Such deflection controlled rolls preferably form, with other rolls, an aperture or gap for the production or treatment of web shaped material, for example, fiber webs or bands.

In order to act upon even locally limited irregularities of the fiber web, the implementation of multiple, axially arranged, relative to the roll, pressure zones is important. In order that support elements 3, having a width of, for example, of 40–100 mm, show only a locally limited effect, in these cases the flexible roll coverings 2 are of major importance.

Each of support elements 3 includes a cylinder-piston device 4, for the formation of a contact force, and a bearing shoe 5. The supplying of the fluid for pressure chambers 6 of cylinder-piston devices 4 occurs individually via separate pressure conduits or lines 7.

In order that pressure conduits 7 show a similar behavior in regard to vibration and damping, pressure conduits 7 are of substantially the same length and have substantially the same fill capacity for the pressure fluid.

In addition, at least the portions of the pressure conduits that extend within the roll are comprised of flexible, highly elastic material. This enables the identically arranged portions thereof, within the roll, to be of substantially the same length. Therewith, the inventive feature can already be carried out during the production of the roll and not only at the connection or during the joining thereof onto the external hydraulic control. Furthermore, the elastic material, in addition to the vibration damping, also increases the pressure reservoir capacity of pressure conduits 7, so that a small leakage of the pressure fluid has a negligible influence on the contact force of the respective support element 3. As a result thereof, it is possible, at times, to separate the pressure conduits 7 from the pressure source that is located outside of the roll. A connection with the pressure source could be effected cyclically or only when the pressure, in a pressure chamber 6 of cylinder-piston device 4, is to be changed, insofar as a definite time period, for example in the range of minutes, is not exceeded. This serves to reduce the control expenses, particularly with deflection controlled rolls having a high number of support elements 3.

In order to simplify the assembly, it is an advantage if all of the pressure conduits 7 are guided from the roll via an easily detachable multiple coupling 8. This can be accomplished, for example, via two opposed, sealed and detachably connected apertured plates 8', 8", whose apertures or holes 9', 9" overlap each other and are each connected with a joint or terminal 10', 10" of a pressure conduit 7.

Furthermore, in order to improve the damping characteristics, it is possible to provide pressure conduits 7 with additional damping elements.

The lubrication of the gaps between the bearing shoes 5 and roll covering 2 can be accomplished, independently of the pressure fluid supply, in a hydrostatic or hydrodynamic manner.

It is of course also possible that the bearing shoes 5 of support elements 3 form a part of a strip or ledge that extends simultaneously over several support elements 3.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A deflection controlled roll comprising:
   a fixed carrier; and
   a roll jacket rotatable about the carrier, the roll jacket being supported on the carrier via a plurality of support elements,
   each of the support elements including at least one cylinder-piston device for the formation of a contact force, at least one bearing shoe with a lubricating fluid supply, at least one pressure chamber, and at least one pressure fluid supply member associated with a pressure fluid supply; and
   the pressure fluid supply members, coupled to the pressure chambers of the cylinder-piston devices, comprising a plurality of pressure conduits, each of the pressure conduits being at least one of approximately the same length and approximately the same volume capacity for pressure fluid.

2. The deflection controlled roll of claim 1, wherein at least sections of the pressure conduits are comprised of a flexible, vibration-damping material.

3. The deflection controlled roll of claim 2, wherein portions of the pressure conduits are located within the roll, with said portions having at least one of approximately the same length and approximately the same volume capacity for the pressure fluid.

4. The deflection controlled roll of claim 3, wherein the pressure conduits are connected with the roll via a multiple coupling.

5. The deflection controlled roll of claim 3, wherein the pressure conduits, with reference to the construction and material composition thereof, are substantially identical.

6. The deflection controlled roll of claim 2, wherein the pressure conduits are connected with the roll via a multiple coupling.

7. The deflection controlled roll of claim 2, wherein the pressure conduits, with reference to the construction and material composition thereof, are substantially identical.

8. The deflection controlled roll of claim 1, wherein portions of the pressure conduits are located within the roll, with said portions having at least one of approximately the same length and approximately the same volume capacity for the pressure fluid.

9. The deflection controlled roll of claim 8, wherein the pressure conduits are connected with the roll via a multiple coupling.

10. The deflection controlled roll of claim 8, wherein the pressure conduits, with reference to the construction and material composition thereof, are substantially identical.

11. The deflection controlled roll of claim 1, wherein the pressure conduits are connected with the roll via a multiple coupling.

12. The deflection controlled roll of claim 11, wherein the pressure conduits, with reference to the construction and material composition thereof, are substantially identical.

13. The deflection controlled roll of claim 1, wherein the pressure conduits, with reference to the construction and material composition thereof, are substantially identical.

* * * * *